(12) United States Patent
Kothandaraman et al.

(10) Patent No.: US 9,909,517 B2
(45) Date of Patent: Mar. 6, 2018

(54) MULT-MODE CONTROLS FOR ENGINES SYSTEMS INCLUDING SCR AFTERTREATMENT

(71) Applicant: Cummins Inc., Colubmus, IN (US)

(72) Inventors: Govindarajan Kothandaraman, Columbus, IN (US); Vivek Anand Sujan, Columbus, IN (US); Abdul R. Ofoli, Columbus, IN (US); Mert Geveci, Delmar, NY (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/358,853

(22) Filed: Nov. 22, 2016

(65) Prior Publication Data

US 2017/0145938 A1 May 25, 2017

Related U.S. Application Data

(60) Provisional application No. 62/258,787, filed on Nov. 23, 2015.

(51) Int. Cl.
| | | |
|---|---|---|
| *F01N 3/00* | (2006.01) | |
| *F02D 41/02* | (2006.01) | |
| *F02D 41/26* | (2006.01) | |
| *F01N 3/20* | (2006.01) | |
| *F01N 11/00* | (2006.01) | |

(52) U.S. Cl.
CPC ....... *F02D 41/0235* (2013.01); *F01N 3/2066* (2013.01); *F01N 11/00* (2013.01); *F02D 41/26* (2013.01); *F01N 2900/1602* (2013.01); *F02D 2200/101* (2013.01)

(58) Field of Classification Search
USPC ................ 60/274, 276, 285, 286, 297, 301; 701/103, 106, 109, 115
See application file for complete search history.

(56) References Cited

U.S. PATENT DOCUMENTS

| | | |
|---|---|---|
| 5,924,280 A | 7/1999 | Tarabulski |
| 6,955,155 B2 | 10/2005 | Surnilla |

(Continued)

FOREIGN PATENT DOCUMENTS

| | | |
|---|---|---|
| EP | 0998625 B1 | 11/2004 |
| WO | 2010068147 A1 | 6/2010 |

*Primary Examiner* — Binh Q Tran
(74) *Attorney, Agent, or Firm* — Taft Stettinius & Hollister LLP

(57) ABSTRACT

An electronic control system is adapted to control a system including an internal combustion engine and an exhaust aftertreatment system including an SCR catalyst. The electronic control system provides a first dynamically determined weighting factor in response to performing a selected one of a plurality of calculations, determines an operating mode of the engine in response to an engine load and an engine speed, selects one of a plurality of inputs in response to the operating mode of the engine to provide an interpolation weighting factor, the plurality of inputs including the first dynamically determined weighting factor and one or more predetermined weighting factors, utilizes the interpolation weighting factor to interpolate between a first set of combustion control data and a second set of combustion control data to determine a set of combustion control values, and controls operation of the engine using the set of combustion control values.

20 Claims, 11 Drawing Sheets

(56) References Cited

U.S. PATENT DOCUMENTS

| | | | |
|---|---|---|---|
| 7,204,227 B2 | 4/2007 | Leone et al. | |
| 7,246,595 B1 | 7/2007 | Hoare et al. | |
| 7,273,045 B2 | 9/2007 | Kurtz et al. | |
| 7,363,915 B2 | 4/2008 | Surnilla et al. | |
| 7,469,693 B2 | 12/2008 | Graves et al. | |
| 7,832,200 B2 | 11/2010 | Kesse et al. | |
| 7,861,518 B2 | 1/2011 | Federle | |
| 8,713,917 B2 * | 5/2014 | Solbrig | F01N 3/208 60/286 |
| 8,869,512 B2 * | 10/2014 | Sujan | F02D 21/08 60/274 |
| 8,973,350 B2 * | 3/2015 | Haseyama | F01N 3/02 60/272 |
| 9,440,193 B2 * | 9/2016 | Iida | F01N 3/208 |
| 9,752,480 B2 * | 9/2017 | Bergh | F01N 3/20 |
| 2004/0098978 A1 | 5/2004 | Tarabulski et al. | |
| 2009/0107430 A1 | 4/2009 | Daigo | |
| 2010/0024397 A1 | 2/2010 | Chi et al. | |

* cited by examiner

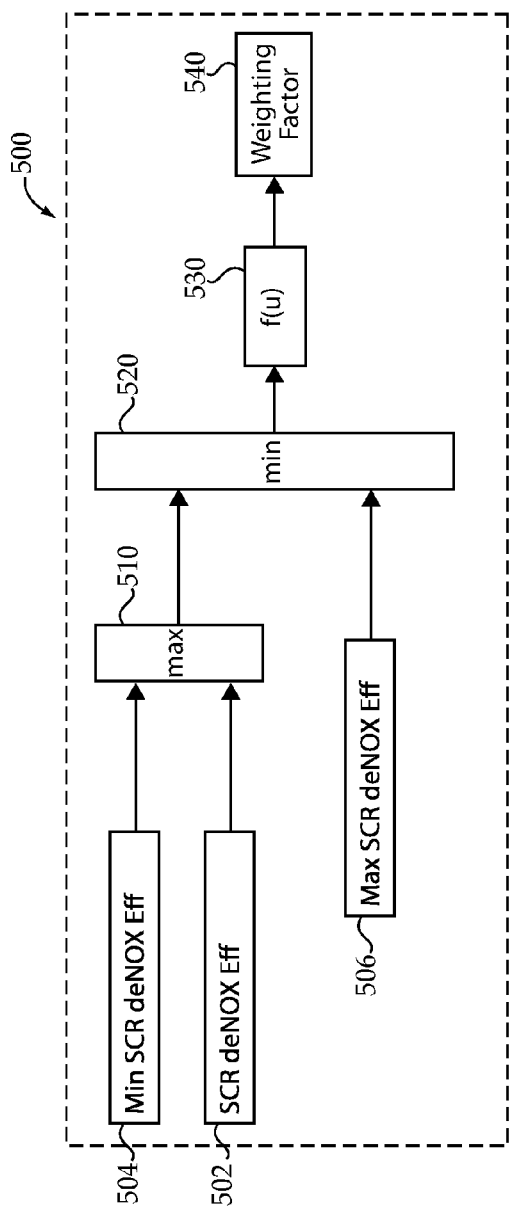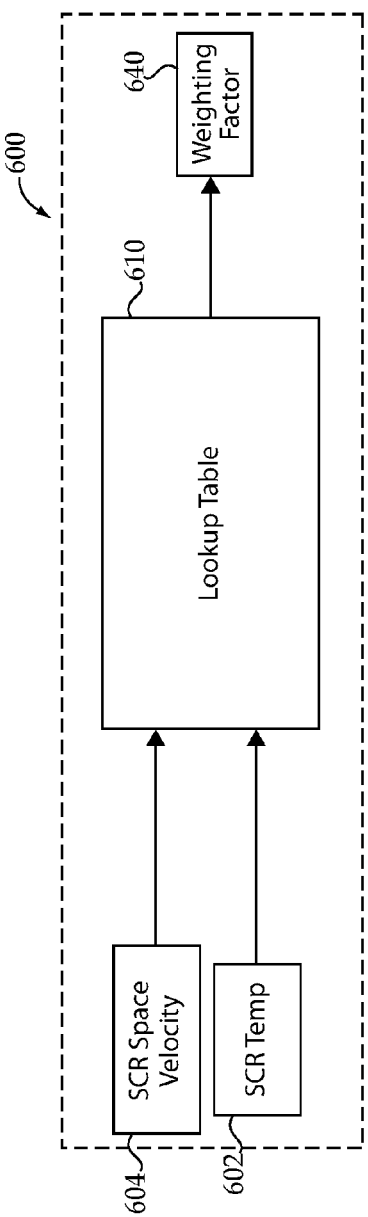

MULT-MODE CONTROLS FOR ENGINES SYSTEMS INCLUDING SCR AFTERTREATMENT

BACKGROUND

The present application relates generally to controls for internal combustion engine systems including SCR exhaust aftertreatment. A number of proposals have been made for controlling such systems. Existing attempts to provide such controls suffer from a number of drawbacks, problems and shortcomings including, for example, those respecting the ability to tailor controls to different engine and SCR exhaust aftertreatment operating conditions and to accommodate variations in platform and/or hardware. There remains a significant need for the unique controls methods, systems, and apparatuses disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art

SUMMARY

Unique apparatuses, methods and systems for control of internal combustion engine systems including SCR exhaust aftertreatment are disclosed. Certain embodiments include controls which regulate engine out NOx to control a burden placed on an SCR catalyst during certain modes of operation and certain operating conditions. Certain embodiments include controls which provide EGR cooler bypass operation to regulate an aftertreatment temperature condition. Further embodiments, forms, objects, features, advantages, aspects, and benefits shall become apparent from the following description and drawings.

BRIEF DESCRIPTION OF THE DRAWINGS

FIGS. 3-10 illustrate exemplary controls for an internal combustion engine system.

DETAILED DESCRIPTION

Figure 1:
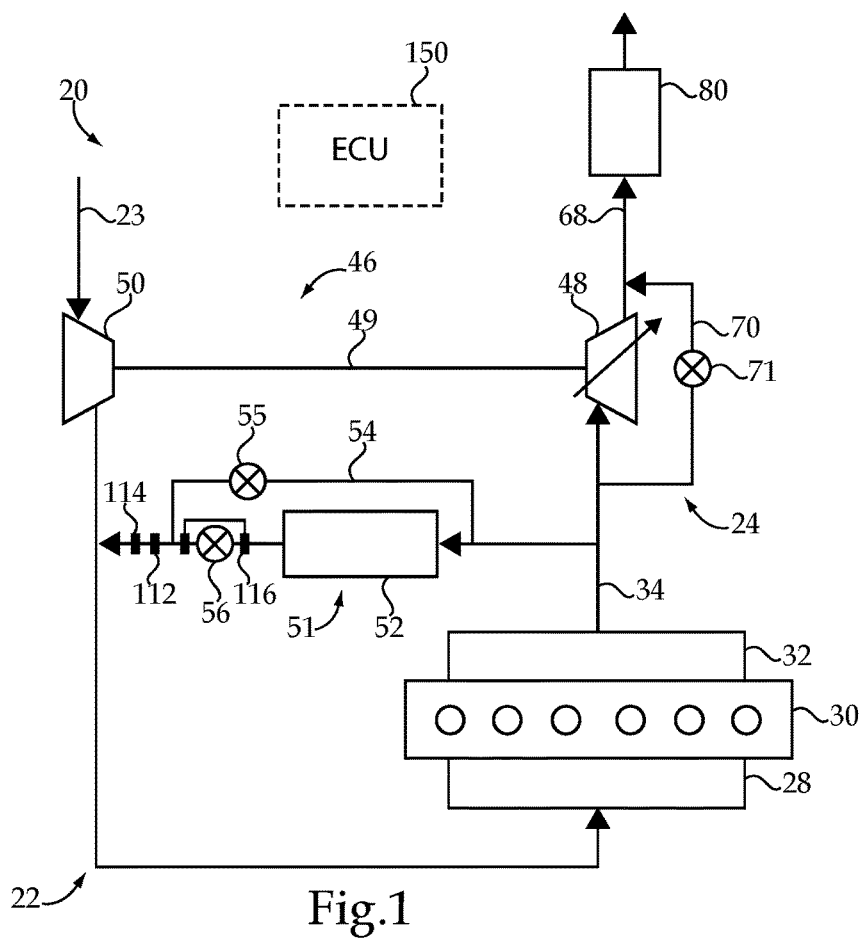
FIG. 1 illustrates certain aspects of an exemplary internal combustion engine system.

With reference to FIG. 1, there is illustrated a schematic diagram depicting certain aspects of an internal combustion engine system 20. System 20 includes an internal combustion engine 30 which is operably coupled with an intake system 22 for providing a charge flow to engine 30 and an exhaust system 24 for output of exhaust generated by engine 30. In the illustrated embodiment, engine 30 is a diesel engine including six cylinders configured in an in-line arrangement. Other embodiments comprise different numbers of cylinders, different cylinder configurations and different fuels and combustion cycles. Engine 30 includes a plurality of pistons slidably disposed within respective cylinders to reciprocate between a top-dead-center position and a bottom-dead-center position. Each of the cylinders, its respective piston, and the cylinder head form a combustion chamber.

Intake system 22 is structured to provide charge flow to the combustion chambers of engine 30. Intake system 22 includes intake conduit 23 which provides ambient air to a compressor 50 of turbocharger 46. Compressor 50 is coupled to turbine 48 via shaft 49 and provides compressed charge flow to intake manifold 28 which distributes the charge flow to cylinders of engine 30. In certain embodiments intake system 22 may include additional air handling elements, for example, a charge air cooler may be provided between compressor 50 and intake manifold 28, additional turbochargers may utilized to provide multi-state turbocharging, and an intake throttle or other flow control devices may be included.

Exhaust system 24 is structured to receive exhaust from the combustion chambers of engine 30. During operation of engine 30, exhaust from the combustion chambers flows to exhaust manifold 32 and to conduit 34. From conduit 34, exhaust flows to one or both of turbine 48 of turbocharger 46 and turbine bypass 70. Turbine bypass valve 71 is structured to control the amount of exhaust, if any, which is allowed to bypass turbine 48 and may be structured as either an on/off valve or variable valve. Turbine 48 is illustrated as a variable geometry turbine but may include other types of turbines. From turbine 48 and bypass 70 exhaust flows to aftertreatment system 80 which includes an SCR catalyst and reductant doser and may also include a diesel particular filter, diesel oxidation catalyst and/or other types of aftertreatment catalysts.

An exhaust gas recirculation (EGR) system 51 provides a controllable exhaust flow path between exhaust system 24 and intake system 22. EGR systems 51 includes an EGR cooler 52, an EGR valve 56, EGR cooler bypass flow path 54, and a bypass valve 55. EGR system 51 is illustrated as a high pressure loop EGR system, however, a low pressure loop EGR system may be utilized in certain embodiments. EGR system 51 includes EGR temperature sensor 112 which is structured to output information indicative of EGR temperature, EGR pressure sensor 114 which is structured to output information indicative of EGR pressure, and EGR delta-pressure sensor 116 which is structured to output information indicative of the pressure difference across EGR valve 56. The information output by sensors 112, 114 and 16 may be provided to one or more controllers such as a controller implemented in electronic control unit (ECU) 150. In the illustrated embodiment sensors 112 and 114 are structured to provide temperature and pressure information for EGR received from EGR cooler 52, EGR bypass flow path 54, or the combined EGR flow from both flow paths. In other embodiments, multiple temperature and/or pressure sensors may be utilized to sense temperature and/or pressure information for the two flow paths individually.

ECU 150 is structured to provide control signals to various components of system 20. In the illustrated embodiment, ECU 150 is structured to provide commands used in controlling a reductant doser (e.g., urea doser) of aftertreatment system 80, an actuator structured to vary the geometry of turbine 48, turbine bypass valve 71, EGR valve 56, EGR cooler bypass valve 55, a fuel pump and injectors associated with engine 30, as well as other components and devices of engine system 20.

ECU 150 is structured to receive information indicating operational characteristics of various components of system 20. ECU 150 is structured to receive temperature and pressure information associated with the SCR catalyst of aftertreatment system 80, temperature and pressure information associated with intake manifold 28, temperature and pressure information associated with exhaust manifold 32, temperature and pressure information associated with EGR system 51 (e.g., the information output by sensors 112, 114 and 116), as well other information associated with the components and devices of engine system 20. It shall be appreciated that the information provided to ECU 150 may be provided by one or more physical sensors, one or more virtual sensors, one or more models or combinations thereof. Thus, while particular sensors are illustrated and described as providing certain information to ECU 150, it is contemplated that such information could be provided by various other sensors, models and/or devices.

In certain embodiments, ECU 150 forms a portion of an electronic control system including one or more computing devices having memory, processing, and communication features. ECU 150 may be a single device or a distributed device, and the functions of ECU 150 may be performed by hardware, software, firmware or a combination thereof. Instructions utilized by ECU 150 may be provided on a computer readable storage medium. ECU 150 may communicate with the sensors or actuators of system 20 in a variety of manners, including through direct communication, communication over a datalink, and/or through communication with other controllers or portions of the processing subsystem that provide sensor and/or actuator information to ECU 150.

In certain embodiments, ECU 150 includes one or more modules structured to functionally execute the operations of the controllers disclosed herein. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components.

Figure 2:
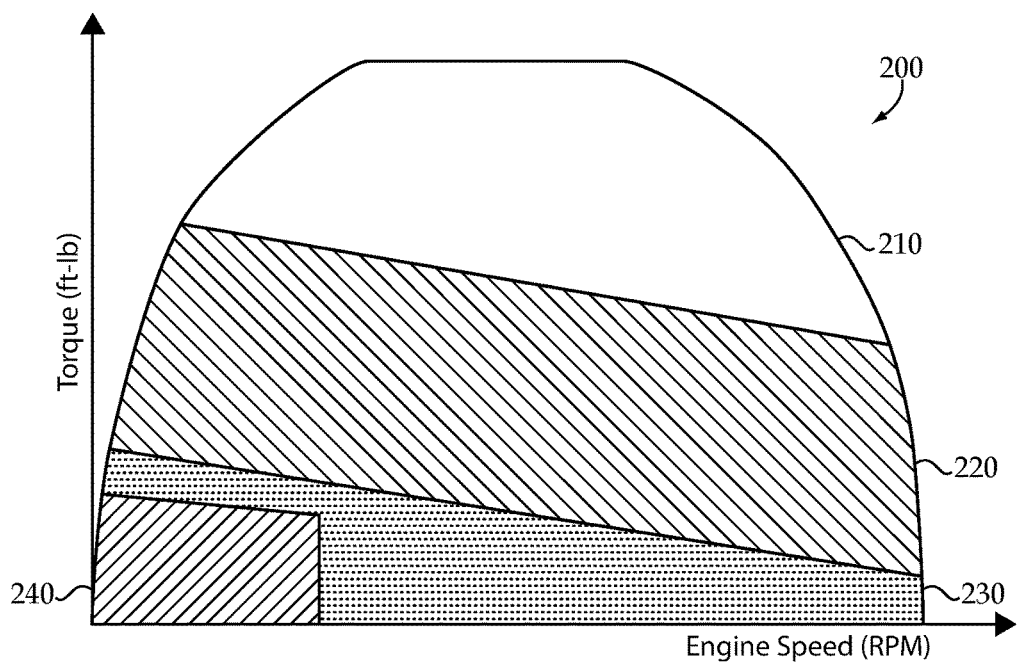
FIG. 2 illustrates an exemplary operating map for an internal combustion engine system.

With reference to FIG. 2 there is illustrated an exemplary engine operating map 200 including an range of engine torque values on its vertical axis and a range of engine speed values on its horizontal axis. Engine operating map 200 comprises a plurality of operating regions 210, 220, 230 and 240. The operating regions of map 200 may be utilized in selecting different engine system control modes. Operating map 200 may be provided in one or more computer readable media and utilized by one or more controllers in order to control operation of an engine system. In certain embodiments, one or more controllers implemented in ECU 150 may utilize operating map 200 in controlling engine system 20. It shall be appreciated, however, that operating maps such as map 200 may be used by a variety of additional or alternate controllers in controlling a variety of additional or alternate systems. It shall be further appreciated that the boundaries, extent, ranges and shapes of the illustrated regions may vary in different embodiments, and that a variety of additional or alternate operating regions may be included in the operating maps of certain embodiments.

When engine system 20 is operating in region 210, a standard diesel control mode may be selected and executed by ECU 150. The standard diesel control mode determines combustion reference values for a plurality of combustion control parameters as a function of one or more engine operating conditions. The combustion control parameters may include charge flow, EGR fraction, turbocharger boost pressure, turbine geometry, total fueling, number of injection pulses, timing of injection pulses, distribution of fuel quantity among multiple injection pulses, injector rail pressure, and/or other parameters influencing combustion. In certain preferred embodiments the combustion reference values which are determined comprise mass charge flow (MCF), EGR fraction, fueling quantity, number of injection pulses, and injection pulse timing. The engine operating conditions may include engine speed, engine load, fueling, engine torque, and/or other engine operating conditions.

The standard diesel control mode utilizes a first set of lookup tables to determine the combustion reference values for the combustion control parameters based upon the engine operating conditions received as inputs. The first set of lookup tables are configured to control operation of a diesel engine system including an SCR aftertreatment system that is operating at or above a first specified efficiency level (e.g., a nominal or rated efficiency level, a maximum efficiency level, or another efficiency level selected as being of sufficient magnitude to utilize the diesel control mode). The efficiency of an SCR system may be determined based upon its operating temperature, space velocity and/or other factors.

When engine system 20 is operating in region 220, an engine out NOx management control mode may be selected and executed by ECU 150. The engine out NOx management control mode also determines combustion reference values for a plurality of combustion control parameters as a function of one or more engine operating conditions. These combustion control parameters and engine operating conditions may be the same or similar to those described above in connection with region 210.

The engine out NOx management control mode utilizes a second set of lookup tables to determine the values of the combustion control parameters. The second set of lookup tables are configured to provide combustion control parameters selected to control or limit engine-out NOx in order to reduce the burden on a downstream SCR exhaust aftertreatment system that is operating at or below a second efficiency level which is less than the first efficiency level. The second efficiency level may be, for example, a minimum efficiency level or an efficiency level selected as being of a magnitude appropriate for the engine out NOx management control mode.

In certain embodiments, the engine out NOx management control mode may utilize a first weighting factor to interpolate between the first set of lookup tables and the second set of lookup tables to provide combustion reference values corresponding to particular points in a range of SCR system efficiency levels. In certain embodiments, the engine out NOx management control mode selects between the first set of lookup tables and the second set of lookup tables to provide combustion control parameters corresponding to different SCR system efficiency levels. In certain forms the engine out NOx management control mode selects between two or more lookup tables without interpolating between the tables. The first weighting factor may be dynamically determined by ECU 150, for example, using the controls described herein below. The engine out NOx management control mode preferably controls engine-out NOx at least in part by controlling the EGR fraction of the intake charge in order to reduce combustion temperature conditions which lead to formation of NOx. It shall be understood, however, that a variety of additional or alternate engine control parameters may be configured to provide a desired engine-out NOx including for example, fueling quantity, injection timing, number of injection pulses, charge flow and others.

When engine system 20 is operating in region 230, a SCR thermal management control mode may be selected and executed by ECU 150. The SCR thermal management control mode determines a plurality of combustion control parameters as a function of one or more engine operating conditions. These combustion control parameters and engine operating conditions may be the same or similar to those described above in connection with region 210.

The SCR thermal management control mode may utilize a third set of lookup tables in determining the values of the combustion control parameters. The third set of lookup tables may be configured to provide combustion control parameters selected to provide a desired temperature condition in order to influence the temperature of one or more components of an exhaust aftertreatment system (e.g., the SCR catalyst). The desired temperature condition may comprise intake manifold temperature, exhaust manifold temperature, an aftertreatment system temperature (e.g., the SCR temperatures noted herein), other air handling and exhaust temperatures, or combinations thereof. The SCR thermal management control mode may interpolate between the first set of operating tables and the third set of operating tables using a second weighting factor to determine combustion control parameters matching conditions of the aftertreatment system (e.g., the SCR space velocity and SCR temperature conditions). The second weighting factor may be dynamically determined by ECU 150, for example, using the controls described herein. SCR thermal management control may be accomplished in whole or in part by increasing the temperature of the EGR provided to the intake system by bypassing EGR flow around an EGR cooler. In addition, aftertreatment temperature control may be accomplished by bypassing a turbocharger turbine which has the effect of decreasing boost pressure and reducing charge flow such that the EGR fraction provides a greater contribution to the overall charge flow. A number of control techniques may be utilized in connection with the SCR thermal management control mode.

Figure 11:
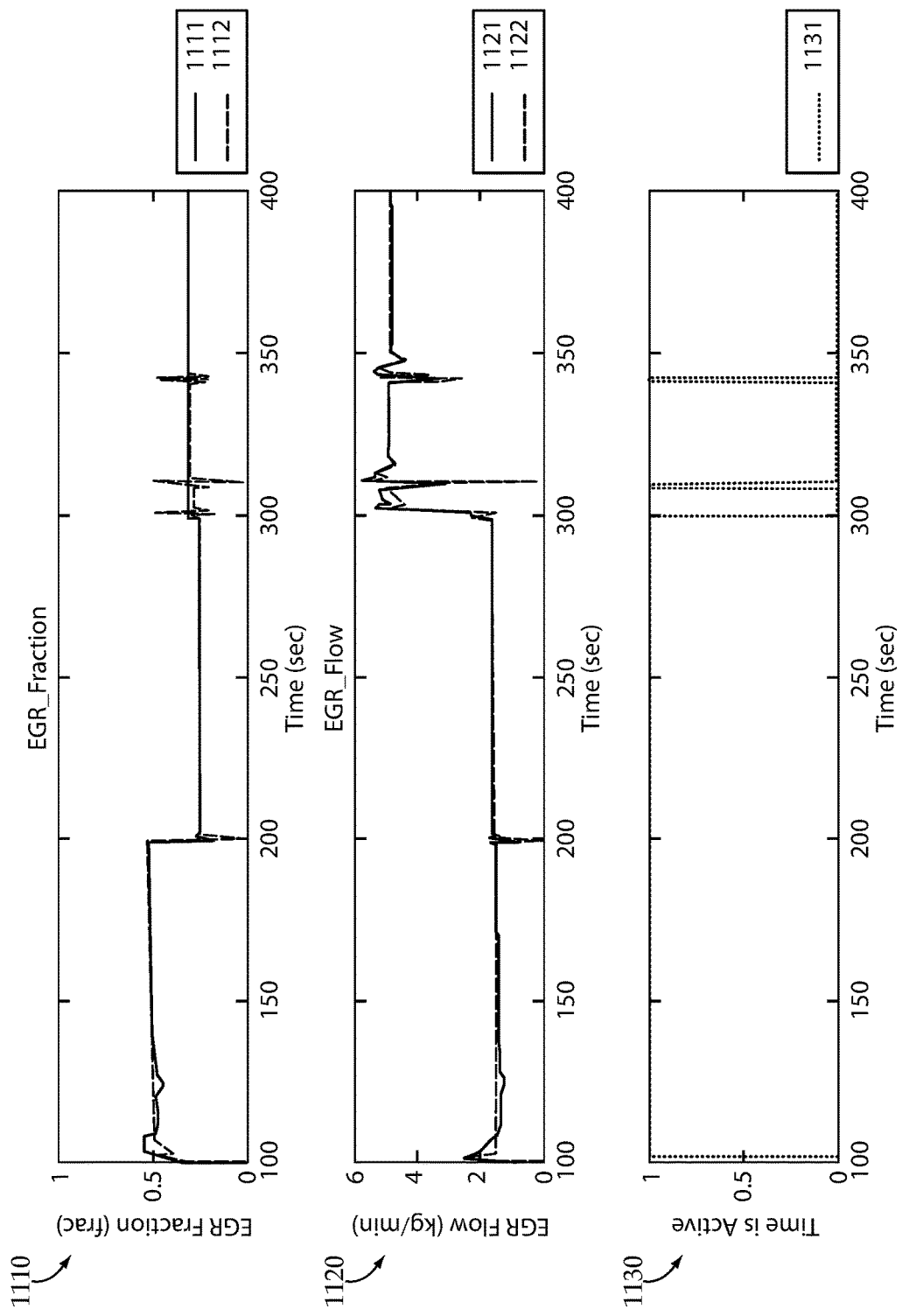
FIG. 11-16 illustrates graphs of exemplary system behavior using various control techniques.
Figure 12:
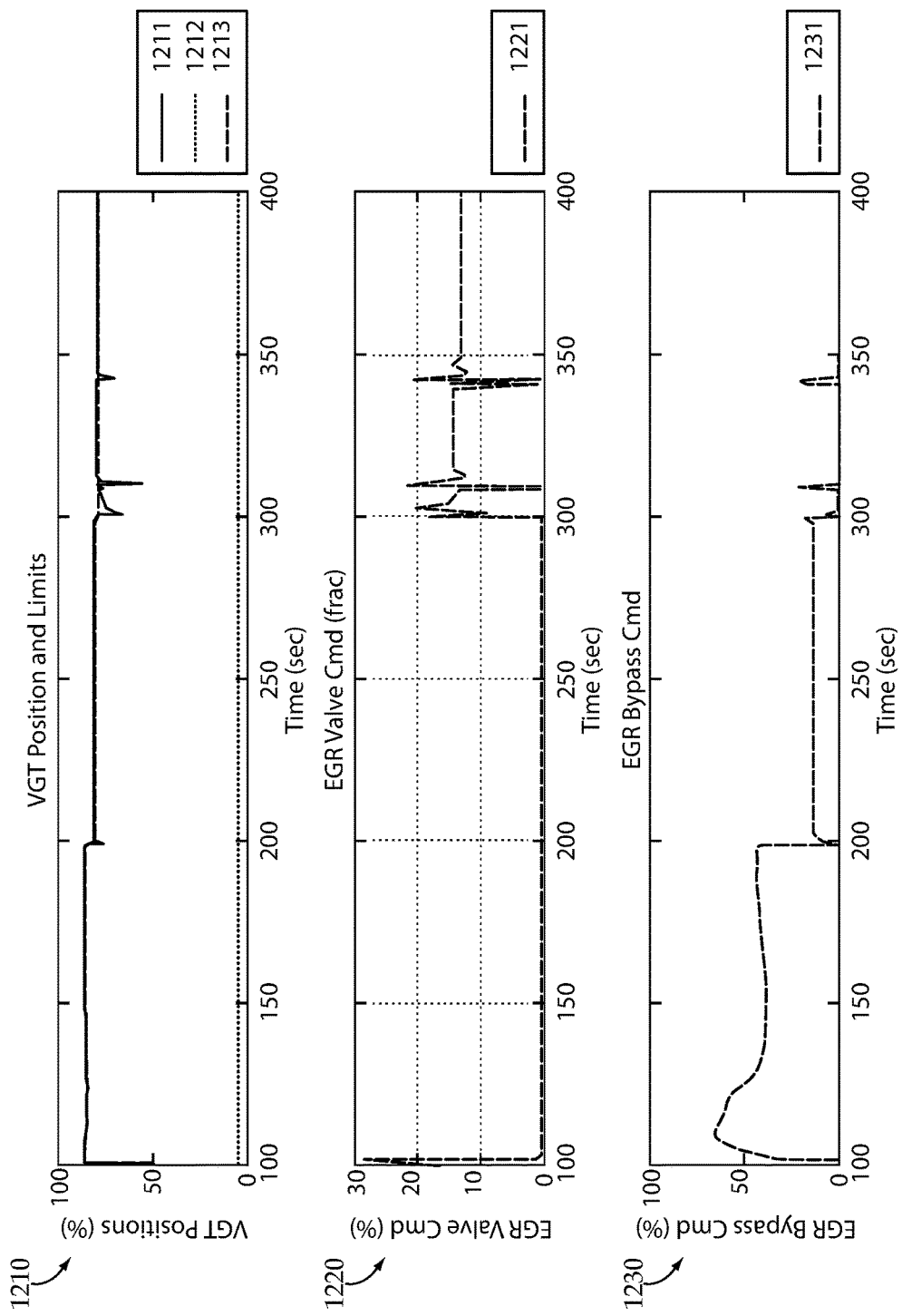

In a first EGR bypass control technique the EGR valve 56 is closed and the bypass valve 54 is modulated using an air handling controller implemented in ECU 150 which manages the position of bypass valve 54, the geometry of the turbine 48, and turbine bypass valve 71 to control charge flow, EGR fraction and EGR temperature or charge temperature in accordance with the combustion control parameters determined by the SCR thermal management control mode. It shall be appreciated that control of EGR temperature may influence a number of different system temperatures that are associated with SCR temperature, including intake manifold temperature, exhaust manifold temperature, various aftertreatment system temperatures including SCR temperature itself, and/or combinations thereof. The EGR valve may be subsequently opened if a need for additional cooled EGR arises. FIGS. 11 and 12 illustrate graphs of exemplary system behavior under the first EGR bypass control technique.

FIG. 11 illustrates graphs of EGR behavior using the first EGR bypass control technique. Graph 1110 illustrates an air handling controller commanded EGR fraction (denoted by line 1111) and a resulting EGR fraction (denoted by line 1112) as a function of time. Graph 1120 illustrates an air handling controller commanded EGR flow (denoted by line 1121) and a resulting EGR fraction (denoted by line 1122) as a function of time. Graph 1130 illustrates a SCR thermal management control mode active command (denoted by line 1131) as a function of time. The effect of changes in the SCR thermal management control mode active command on EGR fraction command and resulting EGR fraction is illustrated by graphs 1110 and 1120.

FIG. 12 illustrates graphs of air handling actuator position using the first EGR bypass control technique. Graph 1210 illustrates the position of a variable geometry turbine (VGT) (denoted by 1211), an upper limit on VGT position (denoted by line 1213) and a lower limit on VGT position (denoted by line 1212) as a function of time. Graph 1220 illustrates the EGR valve position command as a function of time (denoted by line 1221). Graph 1230 illustrates bypass valve position command (denoted by 1231). The effect of changes in the SCR thermal management control mode active command on VGT position is illustrated by graph 1210. The effect of changes in the SCR thermal management control mode active command on EGR valve position is illustrated by graph 1220. The effect of changes in the SCR thermal management control mode active command on bypass valve position is illustrated by graph 1230.

In a second EGR bypass control technique the EGR valve 56 is modulated using an air handling controller implemented in ECU 150 which manages the position of EGR valve 56, the geometry of the turbine 48, and turbine bypass valve 71 to control EGR fraction and charge flow in accordance with the combustion control parameters determined by the SCR thermal management control mode. The bypass valve 54 is modulated using closed loop controller implemented in ECU 150 which manages the position of bypass valve 54 in accordance with a desired temperature (e.g., a desired intake manifold temperature or a desired exhaust manifold temperature which may influence and thereby be associated with an SCR temperature). In certain forms of the second EGR bypass control technique, when a lower limit on EGR valve position is reached, the controls may select between maintaining temperature by continuing operation as described above and maintaining intake flow by closing the EGR valve and using the air handling controller to modulate the position of the bypass valve 54.

Figure 13:
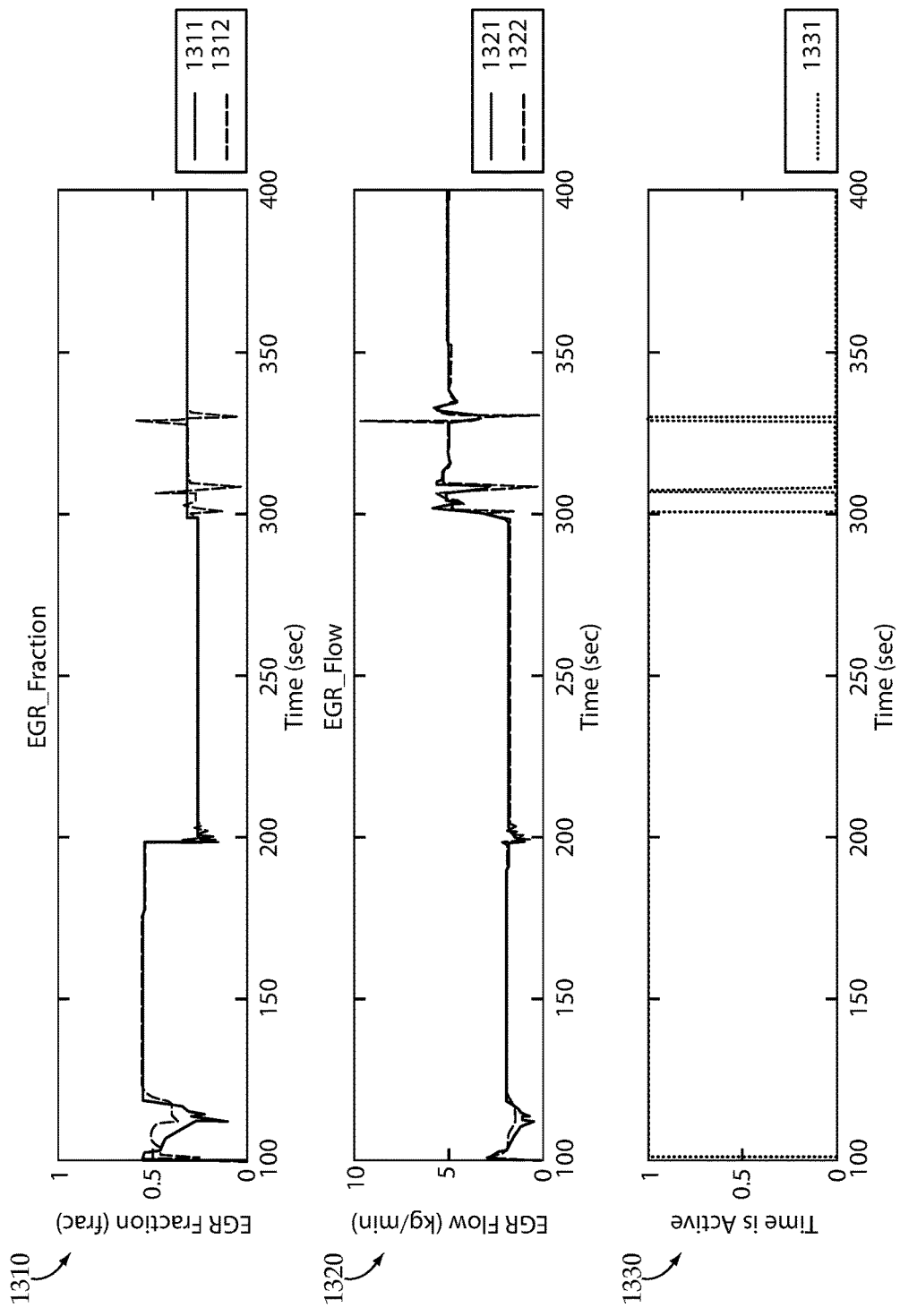

FIG. 13 illustrates graphs of EGR behavior using the first EGR bypass control technique. Graph 1310 illustrates an air handling controller commanded EGR fraction (denoted by line 1311) and a resulting EGR fraction (denoted by line 1312) as a function of time. Graph 1320 illustrates an air handling controller commanded EGR flow (denoted by 1321) and a resulting EGR fraction (denoted 1322) as a function of time. Graph 1330 illustrates a SCR thermal management control mode active command (denoted by 1331) as a function of time. The effect of changes in the SCR thermal management control mode active command on EGR fraction command and resulting EGR fraction is illustrated by graphs 1310 and 1320.

Figure 14:
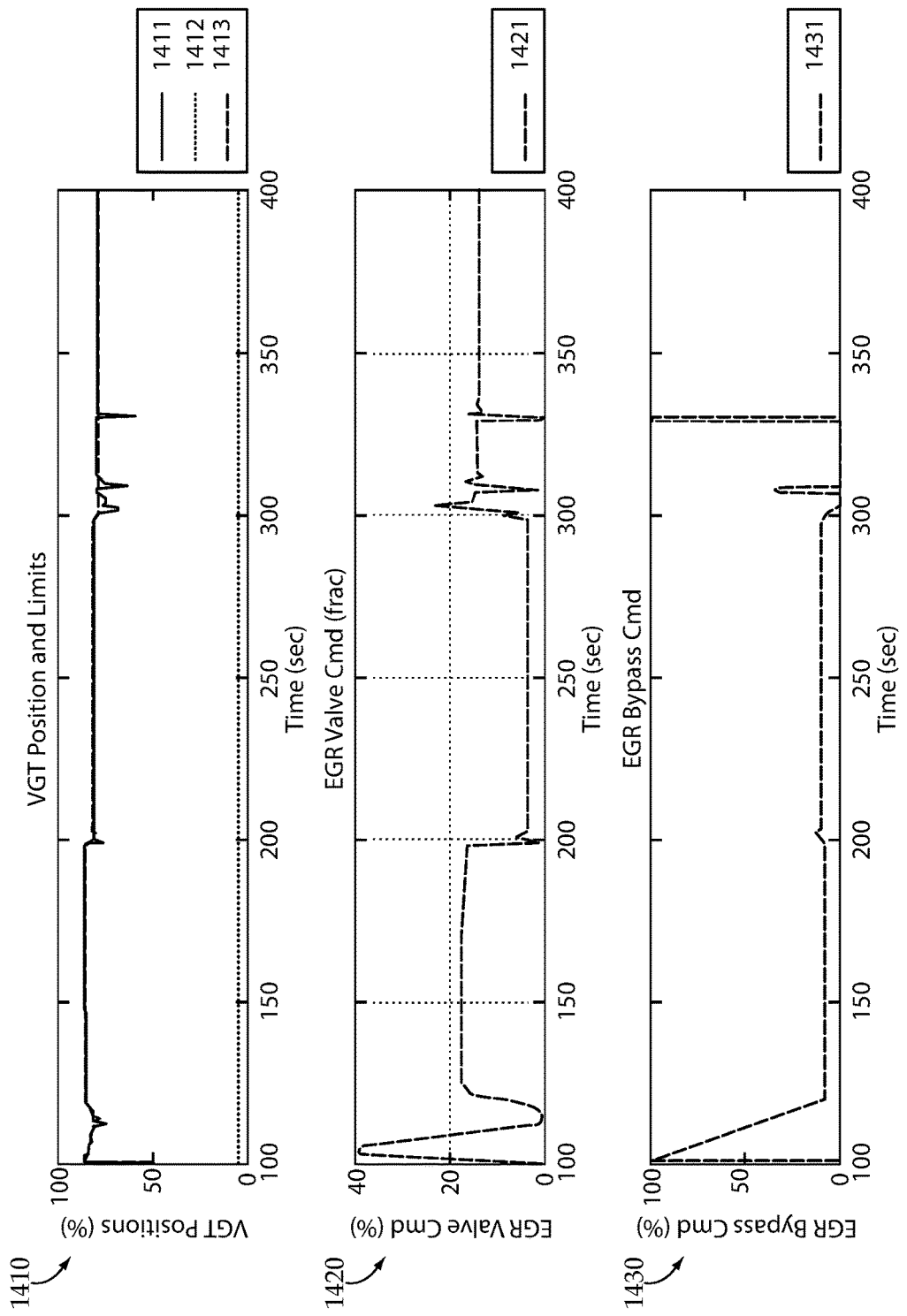

FIG. 14 illustrates graphs of air handling actuator position using the first EGR bypass control technique. Graph 1410 illustrates the position of a variable geometry turbine (VGT) (denoted line 1411), an upper limit on VGT position (denoted by 1413) and a lower limit on VGT position (denoted by 1412) as a function of time. Graph 1420 illustrates the EGR valve position command (denoted by line 1421) as a function of time. Graph 1430 illustrates bypass valve position command (denoted by 1431). The effect of changes in the SCR thermal management control mode active command on VGT position is illustrated by graph 1410. The effect of changes in the SCR thermal management control mode active command on EGR valve position is illustrated by graph 1420. The effect of changes in the SCR thermal management control mode active command on bypass valve position is illustrated by graph 1430.

In a third EGR bypass control technique the EGR valve 56 is modulated using an air handling controller implemented in ECU 150 which manages the position of EGR valve 56, the geometry of the turbine 48, and turbine bypass valve 71 to control EGR fraction and charge flow in accordance with the combustion control parameters determined by the SCR thermal management control mode. The bypass valve 54 is modulated using a controller implemented in ECU 150 which selectably opens and closes the bypass valve, or uses a lookup table to select bypass valve position according to a schedule of discrete positions in order to control to a desired temperature (e.g., a desired intake manifold temperature or a desired exhaust manifold temperature). In certain forms of the second EGR bypass control technique, when a lower limit on EGR valve position is reached, the controls may select between maintaining temperature by continuing operation as described above and maintaining intake flow by closing the EGR valve and using the air handling controller to modulate the position of the bypass valve 54.

Figure 15:
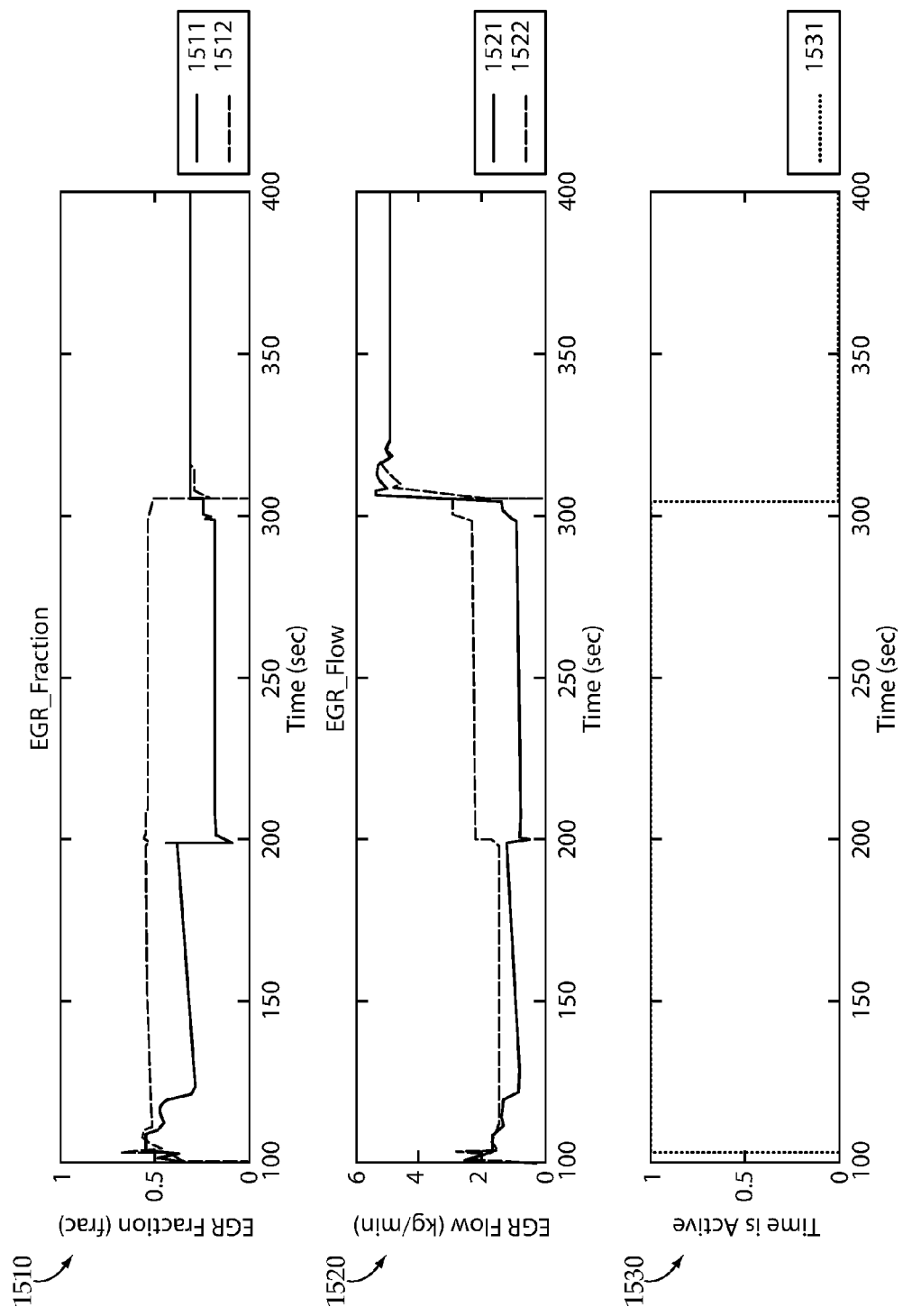

FIG. 15 illustrates graphs of EGR behavior using the first EGR bypass control technique. Graph 1510 illustrates an air handling controller commanded EGR fraction (denoted by line 1511) and a resulting EGR fraction (denoted by line 1512) as a function of time. Graph 1520 illustrates an air handling controller commanded EGR flow (denoted by line 1521) and a resulting EGR fraction (denoted by line 1522) as a function of time. Graph 1530 illustrates a SCR thermal management control mode active command (denoted by line 1531) as a function of time. The effect of changes in the SCR thermal management control mode active command on EGR fraction command and resulting EGR fraction is illustrated by graphs 1510 and 1520.

Figure 16:
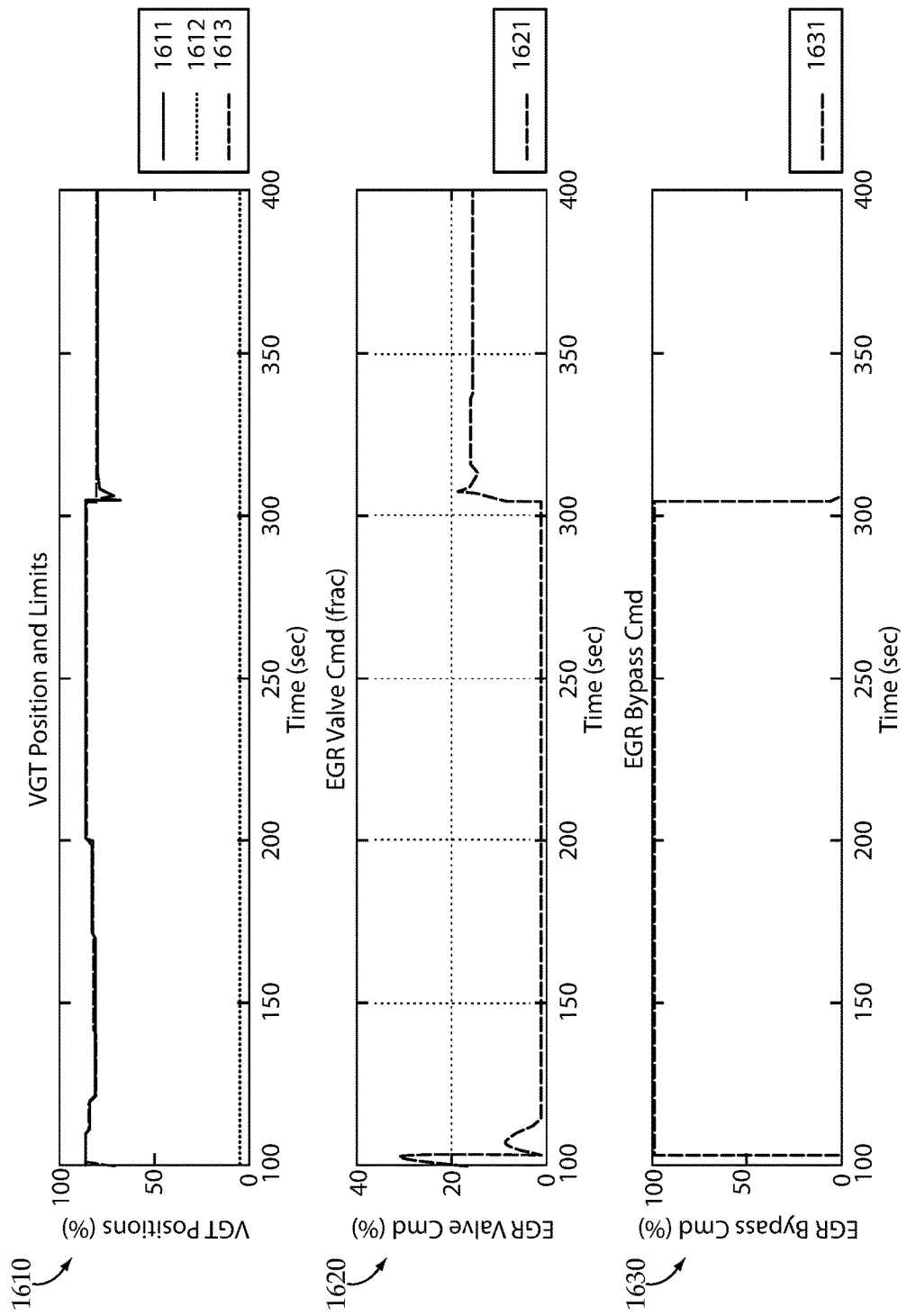

FIG. 16 illustrates graphs of air handling actuator position using the first EGR bypass control technique. Graph 1610 illustrates the position of a variable geometry turbine (VGT) (denoted by line 1611), an upper limit on VGT position (denoted by lie 1613) and a lower limit on VGT position (denoted by line 1612) as a function of time. Graph 1620 illustrates the EGR valve position command (denoted by line 1621) as a function of time. Graph 1630 illustrates bypass valve position command (denoted by line 1631). The effect of changes in the SCR thermal management control mode active command on VGT position is illustrated by graph 1610. The effect of changes in the SCR thermal management control mode active command on EGR valve position is illustrated by graph 1620. The effect of changes in the SCR thermal management control mode active command on bypass valve position is illustrated by graph 1630.

When engine system 20 is operating in region 240, a low flow control mode may be selected and executed by ECU 150. The low flow control mode is utilized to override the SCR thermal management control mode at low engine speed and low engine torque conditions where control based on EGR cooler bypass is of limited efficacy due to the relatively low magnitude of charge flow provided to the engine. The low flow control mode results in the required exhaust temperatures in spite of low flows. In certain forms this is accomplished by selecting air handling references that increase the pumping losses across the engine resulting in high exhaust heat which can be used to maintain the after-treatment temperatures at a desired level. The low flow control mode also determines combustion reference values for a plurality of combustion control parameters as a function of one or more engine operating conditions. These combustion control parameters and engine operating conditions may be the same or similar to those described above in connection with region 210. The low flow control mode may utilize the first set of lookup tables to determine the values of the combustion control parameters, or it may use a fourth set of lookup tables adapted to low charge flow conditions.

A number of variations on the control features used in operating regions 210, 220, 230 and 240 are contemplated. For example, while the preferred embodiments herein are described as using lookup tables, a variety of alternate or additional control features may be utilized including, for example, operation maps, models, control algorithms, or other combustion parameter determination sources may be utilized alternatively or in addition to the first set of lookup tables. It shall be appreciated that references to lookup tables herein extend to and encompass the use of lookup tables in combination with such control features as well as the provision of equivalent functionality utilizing such controls features as alternatives to lookup tables.

Figure 3:
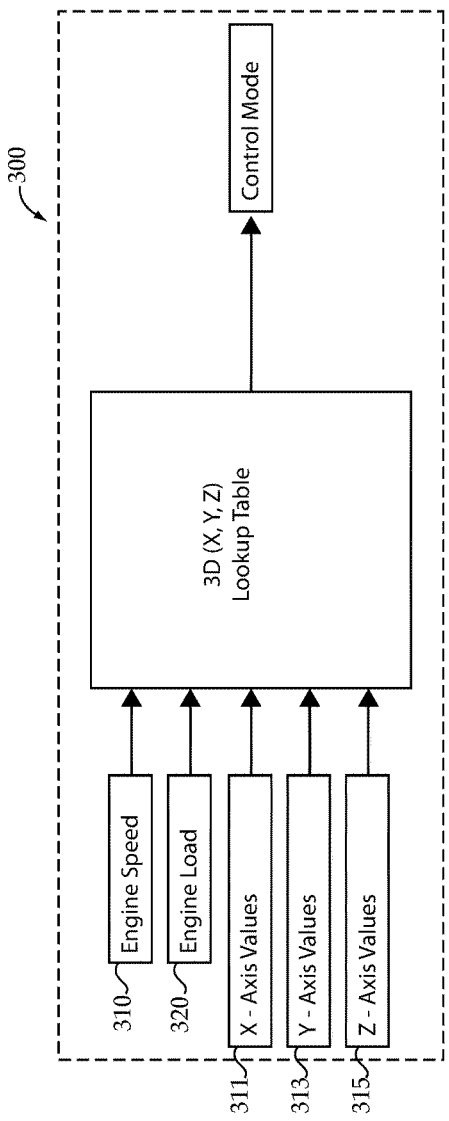

With reference to FIG. 3, there is illustrated a block diagram of exemplary controls 300 which may be utilized to select among the various control modes corresponding to operating regions 210, 220, 230 and 240. Controls 300 may be implemented in one or more elements of an electronic control system, for example, in ECU 150, in order to control operation of an engine system, such as engine system 20. Controls 300 utilize a three-dimensional (X, Y, Z) lookup table 330. The X-axis values of table 330 are specified by input 311 which is calibrated to provide a predetermined array of engine operating speed values. The Y-axis values of table 330 are specified by input 313 which is calibrated to provide a predetermined array of engine load values (e.g., torque values, or total fueling values). The Z-axis values of table 330 are specified by input 315 which is calibrated with values specifying one of operating regions 210, 220, 230 and 240 for each combination of X-axis and Y-axis values. Input 310 provides current engine speed values to table 330 and input 320 provides current engine load values (e.g., torque values, or total fueling values) to table 330. Table 330 uses the values of inputs 310 and 320 and the table definitions provided by inputs 311, 313 and 315 to determine which of operating regions 210, 220, 230 and 240 the system is currently operating and to select the corresponding control mode which is provided as output variable 340.

Figure 4:
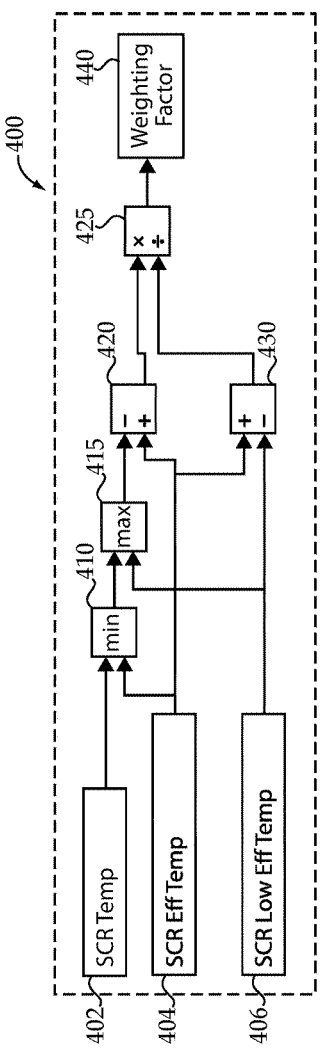

With reference to FIG. 4 there is illustrated a block diagram of exemplary controls 400 which may be utilized to determine a weighting factor that is utilized by the engine out NOx management control mode of operating region 220 to interpolate between the first set of lookup tables and the second set of lookup tables. Controls 400 may be implemented in one or more elements of an electronic control system, for example, in ECU 150, in order to control operation of an engine system, such as engine system 20.

Controls 400 are structured to perform one evaluation of certain conditions associated with an SCR catalyst to determine a weighting factor for the engine out NOx management control mode using a first technique wherein the weighting factor depends upon an SCR temperature value (e.g., SCR catalyst bed temperature, SCR inlet temperature, SCR housing temperature, SCR outlet temperature, and/or other values indicating the temperature of the SCR catalyst). Input 402 provides a current SCR temperature value. Input 404 provides a calibratible predetermined value indicating a temperature at or above which the SCR catalyst is operating at a desired efficiency. Input 406 provides a calibratible predetermined value indicating a temperature at or below which the SCR catalyst is operating at lowest efficiency. Operator 410 receives inputs 402 and 404 and outputs the lesser of these two values. Operator 415 receives the output of operator 410 and input 406 and outputs the greater of these two values. Operator 420 receives input 404 and the output of operator 415 and outputs the difference between these two values (e.g., the value of input 404 minus the value output by operator 415). Operator 430 receives input 404 and input 406 and outputs the difference between these two values (e.g., the value of input 404 minus the value of input 406). Operator 425 receives the output of operator 420 and the output of operator 430 and outputs the quotient of these two values (e.g., the value output by operator 420 divided by the value output by operator 430). The value output by operator 425 is utilizes to provide weighting factor 440.

It shall be appreciated that controls 400 comprise one example of controls that evaluate an SCR temperature relative to a first temperature at or above which the SCR catalyst is operating at a desired efficiency and a second temperature at or below which the SCR catalyst is operating at a lowest efficiency. When the SCR temperature is above a temperature at or above which the SCR catalyst is operating at a desired efficiency, controls 400 set the value of weighting factor to a minimum value (e.g., to zero or a non-zero minimum value). When the SCR temperature is below a temperature at or below which the SCR catalyst is operating at a lowest efficiency, controls 400 set the value of weighting factor to a maximum value (e.g., to 1 or another maximum value). In between these two extremes, the weighting factor will vary linearly with the SCR temperature. The weighting factor may be utilized by the engine out NOx management control mode of operating region 220 to interpolate between the first set of lookup tables and the second set of lookup tables. When the weighting factor is zero the interpolation results in the values of the first set of operating tables being utilized. When the weighting factor is 1 the interpolation results in the values of the second set of operating tables being utilized. When the weighting factor is between zero and 1, the interpolation results in values interpolated between the first set of operating tables and the second set of operating tables being utilized.

With reference to FIG. 5 there is illustrated a block diagram of exemplary controls 500 which may be utilized to determine a weighting factor that is utilized by the engine out NOx management control mode of operating region 220 to interpolate between the first set of lookup tables and the second set of lookup tables. Controls 500 may be implemented in one or elements of an electronic control system, for example, in ECU 150, in order to control operation of an engine system, such as engine system 20.

Controls 500 are structured to perform one evaluation of certain conditions associated with an SCR catalyst to determine a weighting factor for the engine out NOx management control mode using a second technique wherein the weighting factor depends upon an SCR deNOx efficiency. The SCR deNOx efficiency may be determined in a number of manners, for example, based upon a comparison of engine out NOx and post SCR catalyst NOx and/or an evaluation of SCR temperature. The SCR deNOx efficiency may be determined using physical sensors, virtual sensors, computer-based models or combinations thereof. Input 502 provides a value indicative of the current SCR deNOx efficiency. Input 504 provides a calibratible predetermined value indicating a minimum SCR deNOx efficiency. Input 506 provides a calibratible predetermined value indicating a maximum SCR deNOx efficiency. Operator 510 receives inputs 502 and 504 and outputs the greater of these two values. Operator 520 receives input 506 and the output of operator 510 and outputs the lesser of these two values.

Operator 530 receives the output of operator 520 and determines a weighting factor based upon these inputs. The value output by operator 530 is utilizes to provide weighting factor 540. The determination performed by operator 530 evaluates an SCR deNOx efficiency relative to the minimum efficiency and a maximum efficiency. When the SCR deNOx efficiency is above the maximum efficiency, controls 500 set the value of weighting factor to a minimum value (e.g., to zero or a non-zero minimum value). When the SCR deNOx efficiency is below the minimum efficiency, controls 400 set the value of weighting factor to a maximum value (e.g., to 1 or another maximum value). In between these two extremes, the weighting factor will vary linearly with the SCR deNOx efficiency. The weighting factor may be utilized by the engine out NOx management control mode of operating region 220 to interpolate between the first set of lookup tables and the second set of lookup tables. When the weighting factor is zero the interpolation results in the values of the first set of operating tables being utilized. When the weighting factor is 1 the interpolation results in the values of the second set of operating tables being utilized. When the weighting factor is between zero and 1, the interpolation results in values interpolated between the first set of operating tables and the second set of operating tables being utilized.

With reference to FIG. 6 there is illustrated a block diagram of exemplary controls 600 which may be utilized to determine a weighting factor that is utilized by the engine out NOx management control mode of operating region 220 to interpolate between the first set of lookup tables and the second set of lookup tables. Controls 600 may be implemented in one or elements of an electronic control system, for example, in ECU 150, in order to control operation of an engine system, such as engine system 20.

Controls 600 are structured to perform one evaluation of certain conditions associated with an SCR catalyst to determine a weighting factor for the engine out NOx management control mode using a third technique wherein the weighting factor depends upon an SCR space velocity and an SCR temperature (e.g., the examples of SCR temperature disclosed herein). Input 602 provides a value indicative of the current SCR temperature. Input 604 provides a value indicative of the current SCR space velocity. Operator 610 receives inputs 602 and 604 and determines a weighting factor value based upon these inputs. Operator 610 may utilize a lookup table which defines a plurality of values for a weighting value for a range of SCR space velocity values and a range of SCR temperature values. The weighting factor values may be determined based upon a calculated prediction, a computer based model, empirical data or a combination thereof. The value output by operator 610 is utilizes to provide weighting factor 640.

Figure 7:
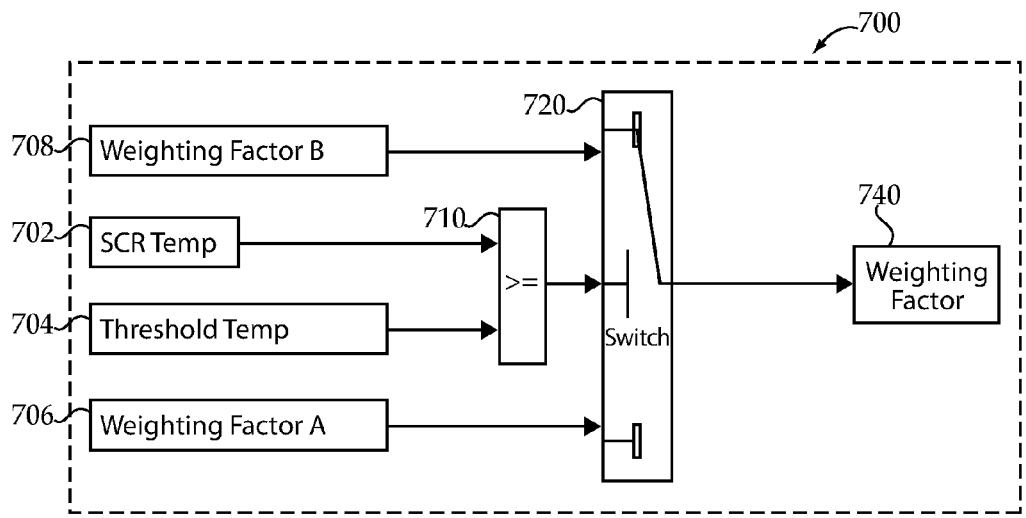

With reference to FIG. 7 there is illustrated a block diagram of exemplary controls 700 which may be utilized to determine a weighting factor that is utilized by the engine out NOx management control mode of operating region 220 to interpolate between the first set of lookup tables and the second set of lookup tables. Controls 700 may be implemented in one or elements of an electronic control system, for example, in ECU 150, in order to control operation of an engine system, such as engine system 20.

Controls 700 are structured to perform one evaluation of certain conditions associated with an SCR catalyst to determine a weighting factor for the engine out NOx management control mode using a fourth technique wherein the weighting factor is a one of a plurality of predetermined calibratible values which are selected based upon an SCR temperature (e.g., the examples of SCR temperature disclosed herein). Input 702 provides a value indicative of the current SCR temperature. Input 704 provides a predetermined calibratible threshold temperature. Input 706 provides a first predetermined calibratible weighting factor value. Input 708 provides a second predetermined calibratible weighting factor value. Operator 710 receives inputs 702 and 704 and outputs a value indicating whether the current SCR temperature is above the threshold value. Operator 720 receives the output of operator 710 and selects one of inputs 706 and 708 based upon the value of this input. The selected input is provided as the output of operator 720 to provide the value of weighting factor 740. While controls 700 are illustrated as implementing a selection between two calibratible weighting factors based on a single threshold determination, it shall be appreciated that further embodiments contemplate selection between greater numbers of calibratible weighting factors and may utilize additional threshold values.

Figure 8:
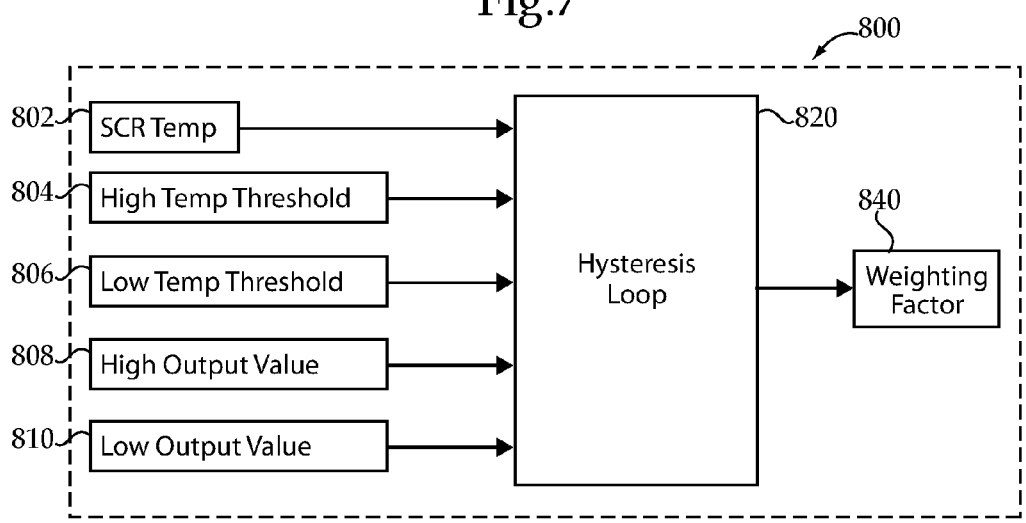

With reference to FIG. 8 there is illustrated a block diagram of exemplary controls 800 which may be utilized to determine a weighting factor that is utilized by the engine out NOx management control mode of operating region 220 to interpolate between the first set of lookup tables and the second set of lookup tables. Controls 800 may be implemented in one or elements of an electronic control system, for example, in ECU 150, in order to control operation of an engine system, such as engine system 20.

Controls 800 are structured to perform one evaluation of certain conditions associated with an SCR catalyst to determine a weighting factor for the engine out NOx management control mode using a fifth technique wherein the weighting factor determined based upon a high or a low SCR temperature (e.g., the examples of SCR temperature disclosed herein) in a hysteresis loop. Input 802 provides a value indicative of the current SCR temperature. Input 804 provides a high temperature threshold for the hysteresis loop. Input 806 provides a low temperature threshold for the hysteresis loop. Input 808 provides a high output value for the hysteresis loop. Input 810 provides a low output value for the hysteresis loop. Operator 820 receives inputs 802, 804, 806, 808 and 810 and uses these inputs in a hysteresis loop to determine a value of weighting factor 840.

Figure 9:
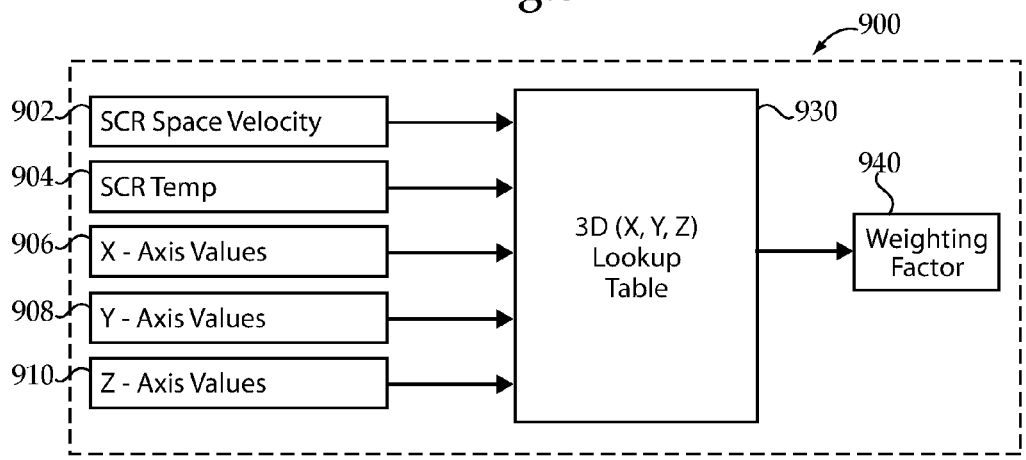

With reference to FIG. 9 there is illustrated a block diagram of exemplary controls 900 which may be utilized to determine a weighting factor that is utilized by the SCR thermal management control mode of operating region 230 to interpolate between the first set of lookup tables and the third set of lookup tables. Controls 900 may be implemented in one or elements of an electronic control system, for example, in ECU 150, in order to control operation of an engine system, such as engine system 20.

Controls 900 utilize a three-dimensional (X, Y, Z) lookup table 930. The X-axis values of table 930 are specified by input 906 which is calibrated to provide a range of SCR space velocity values (e.g., the quotient of the volumetric flow rate of the reactants entering the SCR reactor divided by the reactor volume or the catalyst bed volume). The Y-axis values of table 930 are specified by input 908 which is calibrated to provide a range of SCR temperature values (e.g., SCR catalyst bed temperature, SCR inlet temperature, SCR housing temperature, SCR outlet temperature, and/or other values indicating the temperature of the SCR catalyst). The Z-axis values of table 930 are specified by input 910 which provides weighting factor values for each combination of X-axis and Y-axis values. Input 902 provides current SCR space velocity values to table 930. Input 904 provides current SCR temperature values to table 930. The values of inputs 902 and 904 and the table definitions provided by inputs 906, 908 and 910 are used by table 930 to determine which a weighting factor 940 that is utilized to determine the combustion reference values as described above.

Figure 10:
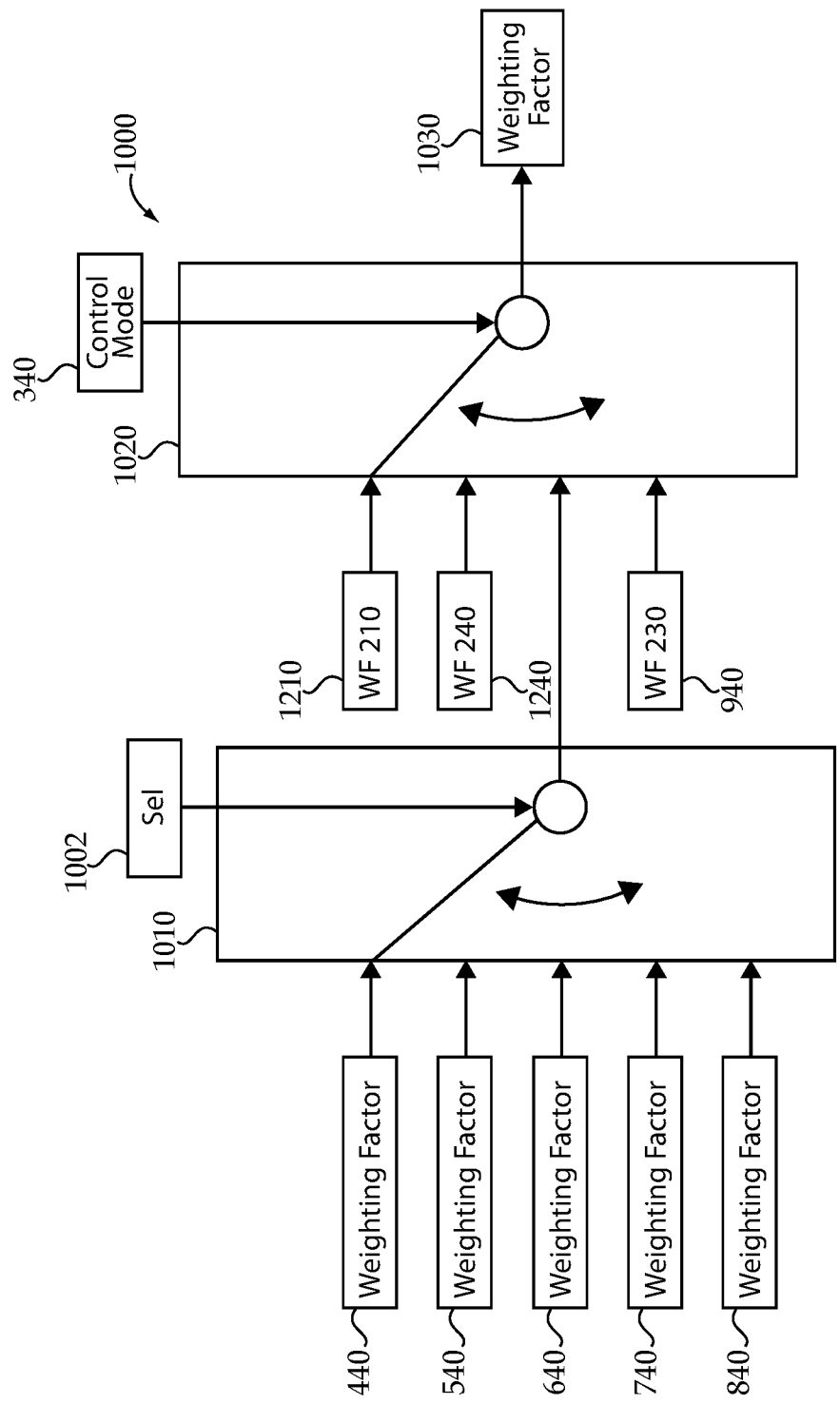

With reference to FIG. 10 there is illustrated a block diagram of exemplary controls 1000 which may be utilized to select among a plurality of weighting factor depending on which of regions 210, 220, 230 and 240 the system is operating. Controls 1000 may be implemented in one or elements of an electronic control system, for example, in ECU 150 and an associated non-transitory memory medium, in order to control operation of an engine system, such as engine system 20.

Controls 1000 include operator 1010 which can select one of weighting factors 440, 540, 640, 740 and 840 determined by controls 400, 500, 600, 700 and 800, respectively, for use as an input in controlling operation of an engine system. Selection input 1002 may be utilized to select among these inputs. The value of input 1002 may be set during calibration of controls 1000 to a predetermined calibratible value effective to provide a selection of one of the weighting factors 440, 540, 640, 740 and 840 which is static during operation of controls 1000 but may be varied through subsequent calibration operations. The value of input 1002 may also be dynamically determined to select from among various different ones of the weighting factors 440, 540, 640, 740 and 840 during operation.

Dynamic determination of selection input 1002 may be based upon engine speed and engine load. For example, different regions of an engine torque-speed operating map may have values assigned to select form among weighting factors 440, 540, 640, 740 and 840. In one embodiment, region 220 of operating map 200 may be further divided into sub-regions. The sub-regions may be defined through empirical evaluation of which weighting factors 440, 540, 640, 740 and 840 provides desired accuracy and/or reliability for a give sub-region of region 220. The dynamic determination may be further based on SCR catalyst efficiency. For example, SCR catalyst temperature and SCR catalyst space velocity may be utilized as surrogates to determine SCR conversion efficiency. In some forms each sub-region of the engine torque-speed operating may be assigned multiple values that vary depending upon the value of the conversion efficiency. In some forms two or more of engine speed, engine load, SCR catalyst temperature and SCR catalyst space velocity may be provided to a lookup table to select form among weighting factors 440, 540, 640, 740 and 840. As noted above the lookup table may be determined based on empirical evaluation of which weighting factors 440, 540, 640, 740 and 840 provides desired accuracy and/or reliability for a given combination of inputs to the lookup table.

Controls 1000 include operator 1020 which can selectably receive and select among the values output by input 1210, input 1240, operator 1010, and controls 900. Controls 300 may be utilized to select among these inputs. When the system is operating in region 210, operator 1020 selects input 1210 as the weighting factor 1030 and the first set of tables is utilized unaltered. When the system is operating in region 220, operator 1020 selects the output of operator 1010 as the weighting factor 1030 and interpolation between the first and second set of tables may be performed using this weighting factor. When the system is operating in region 230, operator 1020 selects the output of controls 900 as the weighting factor 1030 and modification or interpolation may be performed using this weighting factor. When the system is operating in region 240, operator 1020 selects the input 1240 as the weighting factor 1030 and modification or interpolation may be performed using this weighting factor.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
an internal combustion engine;
an exhaust aftertreatment system including an SCR catalyst structured to receive exhaust produced by the engine; and
a controller in operative communication with the engine and the exhaust aftertreatment system, the controller being structured to
select one of a plurality of SCR catalyst evaluations to provide a first dynamically determined weighting factor, the plurality of SCR catalyst evaluations structured to evaluate operation of the SCR catalyst using at least one of different inputs and different evaluation operations,
determine an operating mode of the engine in response to an engine load and an engine speed,
select one of a plurality of inputs in response to the operating mode of the engine to provide an interpolation weighting factor, the plurality of inputs including the first dynamically determined weighting factor, one or more predetermined weighting factors and a second dynamically determined weighting factor,
utilize the interpolation weighting factor to interpolate between a first set of combustion control data and a second set of combustion control data to determine a set of combustion control values, and
control operation of the engine using the set of combustion control values.

2. The system of claim 1 wherein the second dynamically determined weighting factor is dynamically determined in response to a temperature value associated with the SCR catalyst and a space velocity value associated with the SCR catalyst.

3. The system of claim 1 wherein the plurality of SCR catalyst evaluations comprises a determination adapted to:
evaluate a current temperature value associated with an SCR catalyst relative to a first threshold value above which the SCR catalyst operates at a first predetermined efficiency and a second threshold value below which the SCR catalyst operates at a second predetermined efficiency less than the first predetermined efficiency,
set the first dynamically determined weighting factor equal to the first threshold value if the current temperature value is greater than the first threshold value,
set the first dynamically determined weighting factor equal to the second threshold value when the if the current temperature is less than second threshold value,
and set the first dynamically determined weighting factor equal to a quotient of (a) the difference between the first threshold value and the current temperature value and (b) difference between the first threshold value and the second threshold value if the current temperature value is intermediate the first threshold value and the second threshold value.

4. The system of claim 1 wherein the plurality of SCR catalyst evaluations comprises a determination adapted to:
evaluate a current temperature value associated with the SCR catalyst relative to a first threshold value and a second threshold value less than the first threshold value,
set the first dynamically determined weighting factor using the first threshold value as an input to a predetermined function when the current temperature is greater than the first threshold value,
set the first dynamically determined weighting factor using the second threshold value as the input to the predetermined function when the current temperature is less than the second threshold value, and
set the first dynamically determined weighting factor using the current temperature value as the input to the predetermined function when the current temperature is between the first predetermined value and the second predetermined value.

5. The system of claim 1 wherein the plurality of SCR catalyst evaluations comprises a determination adapted to set the first dynamically determined weighting factor in response to a current temperature value associated with the SCR catalyst and a current space velocity value associated with the SCR catalyst.

6. The system of claim 1 wherein the plurality of SCR catalyst evaluations comprises a determination adapted to set the first dynamically determined weighting factor as one of a first predetermined value and a second predetermined value in response to an evaluation of a current temperature value associated with the SCR catalyst relative to a threshold value.

7. The system of claim 1 wherein the plurality of SCR catalyst evaluations comprises a determination adapted to set the first dynamically determined weighting factor in response to the output of a hysteresis loop which utilizes a current temperature value associated with the SCR catalyst, a high hysteresis loop temperature threshold, a high hysteresis loop value, a low hysteresis loop temperature threshold, a low hysteresis loop value.

8. A method of controlling a system including an internal combustion engine, an exhaust aftertreatment system including an SCR catalyst operatively coupled with the engine, and an electronic control system in operative communication with the engine and the exhaust aftertreatment system, the method comprising:
operating the electronic control system to perform the acts of
providing a first dynamically determined weighting factor in response to performing a selected one of a plurality of calculations, the plurality calculations utilizing at least one of different inputs pertaining to operation of the SCR catalyst, and different calculations pertaining to operation of the SCR catalyst, determining an operating mode of the engine in response to an engine load and an engine speed, selecting one of a plurality of inputs in response to the operating mode of the engine to provide an interpolation weighting factor, the plurality of inputs including the first dynamically determined weighting factor, and one or more predetermined weighting factors, utilizing the interpolation weighting factor to interpolate between a first set of combustion control data and a second set of combustion control data to determine a set of combustion control values, and controlling operation of the engine using the set of combustion control values.

9. The method of claim 8 wherein the plurality of inputs include a second dynamically determined weighting factor which is dynamically determined using an SCR catalyst temperature value and an SCR space velocity value.

10. The method of claim 9 wherein the second the second dynamically determined weighting factor is dynamically determined by inputting the SCR catalyst temperature value and the SCR space velocity value to a lookup table and setting the second dynamically determined weighting factor equal to the output of the lookup table.

11. The method of claim 8 further comprising dynamically selecting the selected one of the plurality of calculations.

12. The method of claim 11 wherein the act of dynamically selecting the selected one of the plurality of calculations is responsive to the engine load and the engine speed.

13. The method of claim 11 wherein the act of dynamically selecting the selected one of the plurality of calculations is further responsive to the space velocity of the SCR catalyst.

14. The method of claim 8 wherein the act of providing the first dynamically determined weighting factor in response to performing the selected one of a plurality of SCR catalyst calculations comprises performing one of:

a first calculation which evaluates a current temperature value associated with an SCR catalyst relative to a first threshold value above which the SCR catalyst operates at a first predetermined efficiency and a second threshold value below which the SCR catalyst operates at a second predetermined efficiency, sets the first dynamically determined weighting factor equal to the first threshold value if the current temperature value is greater than the first threshold value, sets the first dynamically determined weighting factor equal to the second threshold value if the current temperature is less than second threshold value, and set the first dynamically determined weighting factor equal to the quotient of (a) the difference between the first threshold value and the current temperature value and (b) difference between the first threshold value and the second threshold value if the current temperature is intermediate the first threshold value and the second threshold value, a second calculation which evaluates a current temperature value associated with the SCR catalyst relative to a first threshold value above which the SCR catalyst operates at a first predetermined efficiency and a second threshold value below which the SCR catalyst operates at a second predetermined efficiency, sets the first dynamically determined weighting factor using the first threshold value as an input to a predetermined function if the current temperature is greater than the first threshold value, sets the first dynamically determined weighting factor using the second threshold value as the input to the predetermined function if the current temperature is less than the second threshold value, and sets the first dynamically determined weighting factor using the current value as the input to the predetermined function if the current temperature is between the first predetermined value and the second predetermined value, a third calculation which sets the first dynamically determined weighting factor based upon a current temperature value associated with the SCR catalyst, a current space velocity value associated with the SCR catalyst, and a lookup table, a fourth calculation which sets the first dynamically determined weighting factor as one of a first predetermined value and a second predetermined value in response to an evaluation of a current temperature value associated with the SCR catalyst relative to a threshold value, and a fifth calculation which sets the first dynamically determined weighting factor in response to the output of a hysteresis loop which utilizes a current temperature value associated with the SCR catalyst, a high hysteresis loop temperature threshold, a high hysteresis loop value, a low hysteresis loop temperature threshold, a low hysteresis loop value.

15. An electronic control system adapted to control a system including an internal combustion engine and an exhaust aftertreatment system including an SCR catalyst operatively coupled with the engine, the electronic control system comprising:

a controller; and a non-transitory controller-readable memory structured with instructions executable by the controller to provide a first dynamically determined weighting factor in response to performing a selected one of a plurality of calculations, the plurality calculations utilizing at least one of different inputs pertaining to operation of the SCR catalyst, and different calculations pertaining to operation of the SCR catalyst, determine an operating mode of the engine in response to an engine load and an engine speed, select one of a plurality of inputs in response to the operating mode of the engine to provide an interpolation weighting factor, the plurality of inputs including the first dynamically determined weighting factor and one or more predetermined weighting factors, utilize the interpolation weighting factor to interpolate between a first set of combustion control data and a second set of combustion control data to determine a set of combustion control values, and control operation of the engine using the set of combustion control values.

16. The electronic control system of claim 15 wherein the plurality of inputs include a second dynamically determined weighting factor which is dynamically determined using one or more SCR catalyst operating characteristics.

17. The electronic control system of claim 16 wherein the second the second dynamically determined weighting factor is dynamically determined by inputting an SCR catalyst temperature value and an SCR space velocity value into a lookup table and setting the second dynamically determined weighting factor equal to the output of the lookup table.

18. The electronic control system of claim 15 further comprising dynamically determining the selected one of the plurality of calculations.

19. The electronic control system of claim 18 wherein the act of dynamically determining the selected one of the plurality of calculations is responsive to the engine load and the engine speed.

20. The electronic control system of claim 19 wherein the act of dynamically determining the selected one of the plurality of calculations is further responsive to one or more SCR catalyst operating characteristics.

* * * * *

UNITED STATES PATENT AND TRADEMARK OFFICE
CERTIFICATE OF CORRECTION

PATENT NO. : 9,909,517 B2
APPLICATION NO. : 15/358853
DATED : March 6, 2018
INVENTOR(S) : Govindarajan Kothandaraman et al.

It is certified that error appears in the above-identified patent and that said Letters Patent is hereby corrected as shown below:

In the Specification

Column 1, after Line 4 Please add the following text below the title:
GOVERNMENT RIGHTS
This invention was made with Government support under DE-FC26-05NT42418 awarded by DOE. The Government has certain rights in this invention.

Signed and Sealed this
Twenty-seventh Day of October, 2020

Andrei Iancu
*Director of the United States Patent and Trademark Office*